United States Patent Office 2,797,247
Patented June 25, 1957

2,797,247

PRODUCTION OF ALCOHOLS AND ETHERS

Carl D. Keith, Munster, Ind., assignor to Sinclair Refining Company, New York, N. Y., a corporation of Maine No Drawing. Application June 10, 1955, Serial No. 514,700

6 Claims. (Cl. 260—614)

This invention relates to the hydration of mono-olefins and to the conversion of alcohols to obtain ethers. More particularly, this invention employs certain solid catalytic materials in the hydration of $C_2$ to $C_4$ olefins to obtain the oxygen-containing products, alcohols, ethers or their mixtures; and in the conversion of $C_2$ to $C_4$ alcohols to obtain ethers either through alcohol dehydration or condensation of alcohol and mono-olefin. Specifically, the catalysts employed in these reactions of the present invention are comprised of a naturally occurring ore known as chrysocolla.

It is known that low molecular weight mono-olefins can be converted to the corresponding alcohols and ethers by contact with water in the presence of various catalytic materials. The reaction products, which may contain predominantly alcohol or ether and usually at least a small proportion of each as well as various amounts of olefin polymer, are particularly useful as gasoline blending agents to obtain fuels of higher octane rating. In this reaction olefins are in part hydrated to alcohols which may in turn at least in part be dehydrated to ethers or combined with olefin feed to form ethers but over all it can be considered that this is a hydration reaction. It is also known that low molecular weight alcohols can be dehydrated to obtain ethers. The water released in this reaction can combine with olefin if present to form alcohol. Should olefin be present in the latter reaction it could also form ether by condensation with alcohol. As an over-all process the olefin feeds are hydrated by contact with water and the catalytic material to obtain ether, alcohol or their mixtures, and after separation of any excess water the amount of ether produced in the alcohol or the mixed products can be increased by conversion over similar type catalysts.

Common sources of olefin feed for these reactions are the relatively pure olefin materials and mixed streams such as the petroleum refinery streams containing propylene and butylenes, both normal and isobutylene, and a substantial amount of $C_3$ or $C_4$ paraffins. A particular stream which can be employed contains from about 50 to 75 volume percent of propylene with the remaining being substantially propane. In the hydration and alcohol conversion reactions, various solid catalysts are known to be effective and can be disposed in a fixed bed or employed in slurry form either on a batch or a continuous basis. In this reaction the water and olefin can be present as liquids or vapors depending upon the particular reaction conditions employed. A principal utility for the products of these reactions is as a gasoline blending component.

The present invention is concerned with these reactions in which certain catalysts have been found to be particularly effective. These catalysts are comprised of a naturally occurring ore known as chrysocolla. This material is of particular physical form of the approximate chemical constituency corresponding to $CuSiO_3 \cdot 2H_2O$. On an average basis this ore analyzes about 45.2% CuO, 34.3 $SiO_2$, and 20.5 $H_2O$. The ore is light blue in color, has a specific gravity between about 2 and 2.2, a surface area of about 389 square meters per gram, a total pore volume of about 0.26 cc. per gram and an average pore radius of about 14 A. This material is found in the United States (Arizona, Wyoming, Nevada, New Jersey, Pennsylvania, Utah, Idaho), England, Hungary, Siberia, Germany and Chile.

The chrysocolla ore is a particularly effective catalyst for the present invention not only because of its chemical constituency but also due to its physical state. Economically, the use of the chrysocolla catalyst is advantageous since it is a relatively low cost material due principally to its occurrence as a natural product which avoids costly procedures for synthetic production. As commercially available chrysocolla is in rather large particle sizes, before being employed in the reactions of the present invention it should be ground or broken to smaller sizes, say generally varying within a range of ¼" particles to those near colloidal size. Representative sizes include 8 to 14 mesh and approximately ⅛" x ⅛" particles.

The small particle form chrysocolla can be used as a solid catalyst in the reactions of this invention either in a fixed bed or in a slurry reaction system without addition of promoting materials. Alternatively, the chrysocolla can be promoted by combination of a wide variety of promoters. Usually these promoters are inorganic and comprise about 1 to 50% of the total catalyst mass and for purposes of the present invention are usually acidic in nature. Most often the promoting agent will be an acidic metal oxide of groups IV to VII of the periodic table or the oxides of the iron transition metals and the platinum metals of group VIII. Examples of acidic metal oxides which can be employed are chromic acid, molybdic acid, tungstic acids, arsenic acid and manganous acid. Various combinations of the promoting agents can also be employed and in particular the acidic metal oxides of groups IV to VII can be combined with the metals of the iron transition group and group IB and IIB to form apparently the metal salts of the acidic oxides. Although it has not been definitely proven that these metals and the acidic oxides exist as true salts, the catalyst preparation conditions of the present invention are such that lead to the belief that the salts are formed in stoichiometric proportions. Other particular promoting agents which can be employed include phosphoric acid which is deposited on the chrysocolla base as an orthophosphate or a pyrophosphate. Also the catalyst base can be impregnated with boric acid or with an aqueous solution of a soluble precursor such as ammonium molybdate followed by acidification to free molybdic acid.

When desired, the chrysocolla structure either when employed as such or with promoting agents can be leached with acids to remove part of the copper of the core and this copper can be replaced by certain metals to afford a mixed metal type of catalyst which enhances its acidity. Among the metals which can be employed in this manner are the iron transition metals, zinc and the platinum group metals. The leaching process is conducted preferably with dilute strong mineral acids such as hydrochloric, sulfuric and nitric acids in order not to destroy the physical state of the chrysocolla structure, and the replacing metals are introduced into it or by impregnation as water-soluble salts.

In the hydration of the low molecular weight mono-olefins and the conversion of $C_2$ to $C_4$ alcohols to ethers it is known that the selection of reaction conditions controls the relative amounts of ether and alcohol in the reaction products. When employing the catalysts of the present invention the reaction temperatures for the hydration of the olefins will generally vary between about 100 to 375° C. with the reaction pressure being within the range from about 15 to 3000 p. s. i. g. or more. In the conversion of the $C_2$ to $C_4$ alcohols to ethers similar reaction temperatures are employed; however, the pressure varies from about atmospheric to 1500 p. s. i. g. or more. In this reaction the higher temperatures are preferred and when no olefin is present to react with water released in forming ether from alcohol, pressures as low as atmospheric are employed. However, when such olefin is present higher pressures generally produce a greater conversion of any olefin present. In both the hydration and alcohol conversion reactions space velocities of about .1 to 5 WHSV (weight of olefin per weight of catalyst per hour) are generally employed. In any event the catalyst is present in an amount sufficient to exhibit a substantial catalytic effect.

The reaction condition which has the most effect upon the distribution of ether and alcohol in the product of the olefin hydration reaction is the water to olefin ratio. For increased alcohol formation the molar ratio of water to olefin is at least 1 to 1 with increased amounts of water assuring a larger formation of alcohol. When ether formation is to be increased the molar ratio of water to olefin is decreased and in particular is less than 0.5 to 1 and may be as low as 0.1 to 1 or less. In the alcohol conversion reaction ether formation can be increased by maintaining an alcohol to olefin molar ratio of at least 1 to 1; of course there need be no olefin present in the reaction.

The present invention will be illustrated further by the following examples which are not to be considered limiting.

Example I

To prepare a promoted chrysocolla catalyst, 100 grams of 8 to 14 mesh naturally occurring ore is covered with an aqueous solution of phosphoric acid containing 1 mole of phosphoric acid per mole of copper in the treating flask. This mixture is allowed to stand for 16 hours at 180° F. and then all free liquor is drained. The resulting phosphoric acid impregnated chrysocolla is heated in air at 400° F. until dry.

Example II 100 grams of 14 to 20 mesh naturally occurring chrysocolla is covered in a flask with 56.8 grams of concentrated HCl (containing 36.5% HCl) and then allowed to stand at room temperature for 16 hours. To the flask is then added a concentrated aqueous solution of sodium pyrophosphate containing 63.3 grams of $Na_4P_2O_7 \cdot 2H_2O$ and this mixture is allowed to stand for 10 minutes. The resulting mixture is filtered, and the filter cake is washed with deionized water until the wash water is essentially free of $Na^+$. The washed solids separated are dried at 400° F. The solids indicate a highly porous skeletal structure of a silicious nature including a phosphorus-containing promoter.

Example III

In a reaction flask 100 grams of 8 to 14 mesh naturally occurring chrysocolla is evacuated at room temperature and covered with an aqueous solution of chromic acid containing 28.5 grams of $CrO_3$. This mixture is allowed to stand for 10 minutes and is then filtered to separate the chromic acid impregnated chrysocolla. These solids are dried at 300° F.

Each of the catalysts of Examples I, II and III is effective in promoting the hydration and dehydration reactions of the present invention. For instance, 50 grams of the catalyst of Example I are placed in a tubular downflow reactor surrounded by a radiant heat furnace and likewise 50 grams of each of the catalysts of Examples II and III are placed, respectively, in separate similar downflow reactors. To each reactor is passed a $C_3$ petroleum refinery stream containing about 70 weight percent propylene with the remaining being substantially propane at the rate of about 50 grams per hour and water at the rate of 15 grams per hour is combined with the refinery gas stream passing to the reactor. The hydration reaction temperature is maintained at 500° F. and a pressure of 1200 p. s. i. g. The effluent stream from the reactor includes isopropyl alcohol, isopropyl ether, unreacted olefin, propane and excess water.

Similarly, each of the catalysts of Examples I to III is employed in the conversion of isopropyl alcohol to isopropyl ether. In these systems a mixture of isopropyl alcohol and isopropyl ether is passed to the reactors containing the catalyst at a temperature of 500° F. and atmospheric pressure and in each case the effluent product is substantially increased in ether content as compared with the feed to the reactors.

It is claimed:

1. The method of converting a mono-olefin containing 2 to 4 carbon atoms to alcohols and ethers which comprises hydrating the olefin with water while in contact with a catalytic amount of chrysocolla.

2. The method of claim 1 in which the olefin is propylene.

3. The method of claim 1 in which the chrysocolla contains a catalytic promoter.

4. The method of producing ether from alcohol containing 2 to 4 carbon atoms which comprises converting alcohol in contact with a catalytic amount of chrysocolla.

5. The method of claim 4 in which the alcohol is isopropyl alcohol.

6. The method of claim 4 in which the chrysocolla contains a catalytic promoter.

References Cited in the file of this patent

UNITED STATES PATENTS

| | | |
|---|---|---|
| 1,999,620 | Peski et al. | Apr. 30, 1935 |
| 2,663,744 | Lukasiewicz et al. | Dec. 22, 1953 |